United States Patent
Huang et al.

(10) Patent No.: US 8,673,176 B2
(45) Date of Patent: Mar. 18, 2014

(54) METHOD OF REUSING MICRO-ENCAPSULATED CHOLESTERIC LIQUID CRYSTAL

(75) Inventors: Pei-Chen Huang, Taipei (TW);
Chih-Lin Su, Hsinchu County (TW);
Kuo-Chang Wang, Taichung (TW);
Shih-Hsien Liu, Hsinchu County (TW);
Kung-Lung Cheng, Hsinchu (TW)

(73) Assignees: Industrial Technology Research Institute, Hsinchu (TW); Chang-Chun Plastics Co., Ltd., Taipei (TW)

( * ) Notice: Subject to any disclaimer, the term of this patent is extended or adjusted under 35 U.S.C. 154(b) by 76 days.

(21) Appl. No.: 13/523,748

(22) Filed: Jun. 14, 2012

(65) Prior Publication Data

US 2013/0146811 A1    Jun. 13, 2013

(30) Foreign Application Priority Data

Dec. 7, 2011   (TW) ................. 100145023 A

(51) Int. Cl.
*C09K 19/02* (2006.01)
*C09K 19/52* (2006.01)
*C09K 19/54* (2006.01)

(52) U.S. Cl.
USPC .................... 252/299.01; 252/299.5

(58) Field of Classification Search
USPC .......................... 252/299.01, 299.5
See application file for complete search history.

(56) References Cited

U.S. PATENT DOCUMENTS

| 5,455,083 | A  | 10/1995 | Noh et al. |
| 7,241,502 | B2 | 7/2007 | Anselmann et al. |
| 2004/0091640 | A1 | 5/2004 | Moon et al. |
| 2006/0276691 | A1 | 12/2006 | Forkey et al. |
| 2009/0317792 | A1 | 12/2009 | Abbott et al. |
| 2010/0279125 | A1 | 11/2010 | Buyuktanir et al. |

FOREIGN PATENT DOCUMENTS

| CN | 1497036 | 5/2004 |
| JP | 57071603 | 5/1982 |
| JP | 2002166259 | 6/2002 |
| JP | 2004137467 | 5/2004 |
| JP | 2004275914 | 10/2004 |
| JP | 2006089519 | 4/2006 |
| JP | 2010214247 | 9/2010 |
| KR | 20020062870 | 7/2002 |
| KR | 20040027328 | 4/2004 |
| TW | I282359 | 6/2007 |
| TW | 200809298 | 7/2007 |
| TW | 201006541 | 2/2010 |
| TW | I327592 | 7/2010 |
| WO | WO 2008053966 | 5/2008 |

OTHER PUBLICATIONS

English translation by computer for JP 2002-166259, http://www4.ipdl.inpit.go.jp/Tokujitu/PAJdetail.ipdl?N0000=60&N0120=01&N2001=2&N3001=2002-166259.*

(Continued)

*Primary Examiner* — Shean C Wu

(57) ABSTRACT

A method of reusing micro-encapsulated cholesteric liquid crystals is provided. The method includes providing a display medium material containing a micro-encapsulated cholesteric liquid crystal and a dispersant. The display medium material is mixed with a solvent to form a mixture having a temperature of between 40° C. and 60° C. A centrifugal process is performed to the mixture for separating the micro-encapsulated cholesteric liquid crystal and the dispersant. Then, the dispersant and the solvent are removed to obtain the micro-encapsulated cholesteric liquid crystal.

8 Claims, 1 Drawing Sheet

(56) References Cited

OTHER PUBLICATIONS

English translation by computer for JP 2004-137467 http://www4.ipdl.inpit.go.jp/Tokujitu/PAJdetail.ipdl?N0000=60&N0120=01&N2001=2&N3001=2004-137467.*

J. Koetz et al., "Recovery of Nanoparticles Produced in Phosphatidylcholing-Based Template Phases," Journal of Colloid and Interface Science, Apr. 2005, pp. 190-198, vol. 284, Elsevier, US.

V. Germain et al., "Silver Nanodisks: Size Selection via Centrifugation and Optical Properties," The Journal of Chemical Physics, Mar. 2005, pp. 124707-1-124707-8, vol. 122, American Institute of Physics, US.

Myakonkaya et al., "Recovery of Nanoparticles Made Easy," Langmuir Letter, Feb. 2010, pp. 3794-3797, vol. 26, American Chemical Society, US.

Cheng-Yi Wang et al.,"Large Scale Bistable Cholesteric Liquid Crystal Display with Thermal Addressing," IDW '10, 2010, pp. 1553-1556, ITE and SID, US.

* cited by examiner

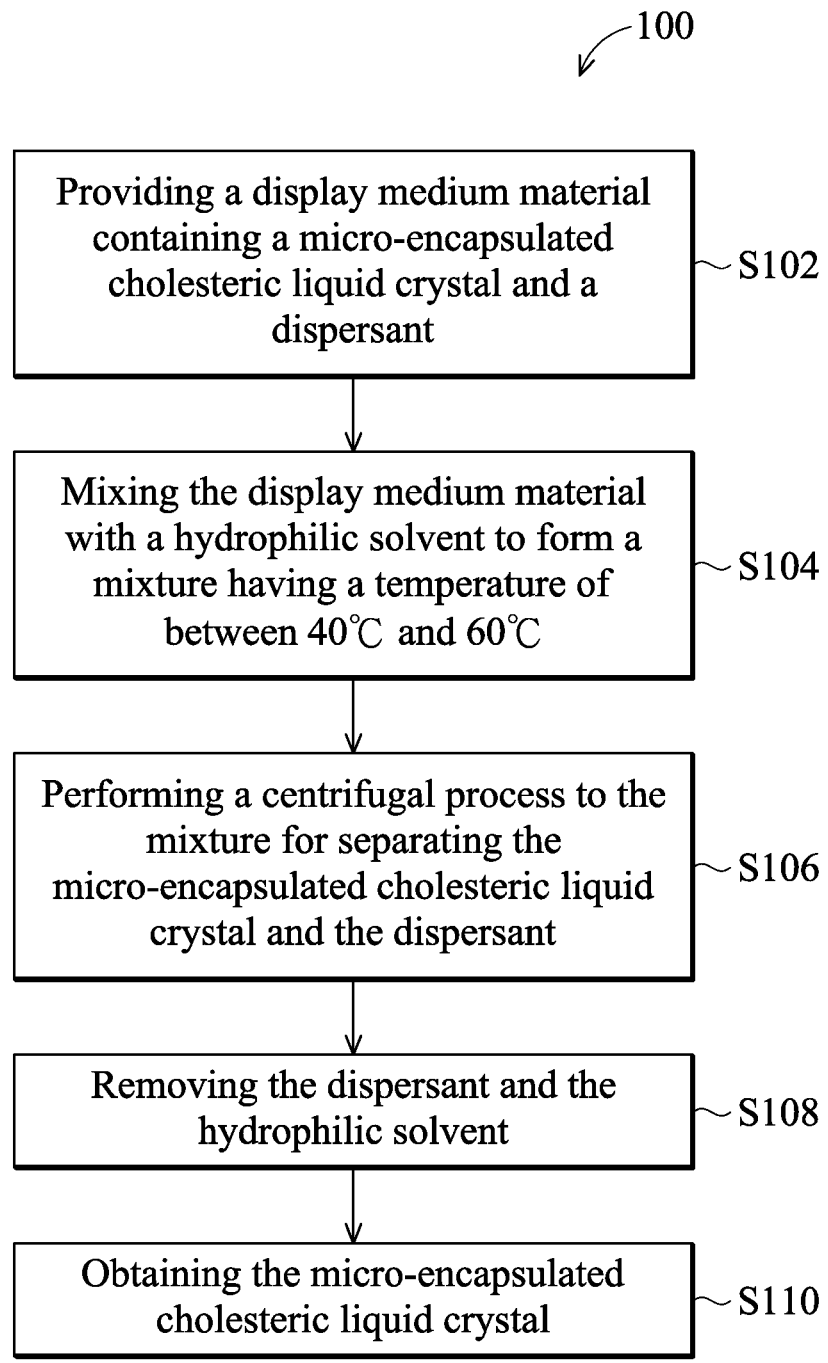

METHOD OF REUSING MICRO-ENCAPSULATED CHOLESTERIC LIQUID CRYSTAL

CROSS REFERENCE TO RELATED APPLICATIONS

This Application claims priority of Taiwan Patent Application No. 100145023, filed on Dec. 7, 2011, the entirety of which is incorporated by reference herein.

BACKGROUND

1. Technical Field

The technical field relates to a micro-encapsulated cholesteric liquid crystal material, and more specifically to a method of reusing a micro-encapsulated cholesteric liquid crystal.

2. Description of the Related Art

Cholesteric liquid crystal displays have advantages of having a bi-stable display character, and a large display area, and being easy to manufacture and resistant to shock. Cholesteric liquid crystal is an important display medium material.

Currently, a fluxional cholesteric liquid crystal is confined within a specific space to form a micro-encapsulated cholesteric liquid crystal by a micro-encapsulating technology. Then, the micro-encapsulated cholesteric liquid crystals are dispersed in a dispersant and then coated on flexible display panels for flexible display applications to satisfy flexibility requirements of flexible displays.

The cost of the cholesteric liquid crystal is expensive and cholesteric liquid crystal waste causes environmental problems. Thus, reusing the micro-encapsulated cholesteric liquid crystals has been an important subject for research as the amount of the micro-encapsulated cholesteric liquid crystals used in flexible displays has greatly increased.

SUMMARY

One embodiment provides a method of reusing micro-encapsulated cholesteric liquid crystals, comprising: providing a display medium material, wherein the display medium material includes a micro-encapsulated cholesteric liquid crystal and a dispersant; mixing the display medium material with a solvent to form a mixture, wherein the mixture has a temperature of between 40° C. and 60° C.; performing a centrifugal process to the mixture for separating the micro-encapsulated cholesteric liquid crystal and the dispersant; removing the dispersant and the solvent; and obtaining the micro-encapsulated cholesteric liquid crystal.

One embodiment provides a method of reprocessing micro-encapsulated cholesteric liquid crystals, comprising: providing a micro-encapsulated cholesteric liquid crystal obtained from the above mentioned method of reusing micro-encapsulated cholesteric liquid crystal; and modulating a photoelectric property of the micro-encapsulated cholesteric liquid crystal.

A detailed description is given in the following embodiments with reference to the accompanying drawings.

BRIEF DESCRIPTION OF THE DRAWINGS

The disclosure can be more fully understood by reading the subsequent detailed description and examples with reference to the accompanying drawings, wherein:

FIG. 1 shows a flow chart of a method of reusing micro-encapsulated cholesteric liquid crystals according to an embodiment.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

According to an embodiment, a micro-encapsulated cholesteric liquid crystal in a display medium material can be reused. The display medium material includes micro-encapsulated cholesteric liquid crystals dispersed in a dispersant. The micro-encapsulated cholesteric liquid crystals are formed by encapsulating a cholesteric liquid crystal in a shell. The shell may be made of $SiO_2$ or polyurethane (PU). The material of the dispersant is for example gelatin or polyvinyl alcohol (PVA). The cholesteric liquid crystal encapsulated by $SiO_2$ is usually dispersed in gelatin. The cholesteric liquid crystal encapsulated by polyurethane (PU) is usually dispersed in polyvinyl alcohol (PVA) or gelatin.

When the display medium material has not been used up, after a period of time, the display medium material may deteriorate. For example, the dispersant in the display medium material may be moldy, or the micro-encapsulated cholesteric liquid crystals may be separated from the dispersant to make the display medium material delaminate. According to the embodiments, the micro-encapsulated cholesteric liquid crystals in the deteriorated display medium material can be reused and reprocessed. Moreover, even though the display medium material has not deteriorated, the micro-encapsulated cholesteric liquid crystals in the deteriorated display medium material can also be reused and reprocessed according to the embodiments to achieve economic benefits and environmental friendliness.

Referring to FIG. 1, which shows a flow chart of a method 100 of reusing micro-encapsulated cholesteric liquid crystals according to an embodiment. Firstly, at the step S102, a display medium material is provided. The display medium material is for example a moldy display medium material or a display medium material which is delaminated. The display medium material includes a micro-encapsulated cholesteric liquid crystal for reuse and a dispersant. Moreover, the display medium material may further include surface active agents, dyes and other additives.

At the step S104, a solvent such as a hydrophilic solvent having a specific temperature is provided. The solvent having the specific temperature is for example a hot water having a temperature of between 40° C. and 60° C. The display medium material and the hydrophilic solvent having the specific temperature are mixed and stirred to form a mixture having a temperature of between 40° C. and 60° C. A weight ratio of the hydrophilic solvent to the display medium material may be between 100:1 and 10:9 or between 10:1 and 10:8. The temperature of the hydrophilic solvent can be modified according to the weight ratio of the hydrophilic solvent to the display medium material to make the mixture of the display medium material and the hydrophilic solvent have a temperature of between 40° C. and 60° C. The dispersant, mold, the surface active agents, dyes and other additives in the display medium material are dissolved in the hydrophilic solvent at the specific temperature, while the micro-encapsulated cholesteric liquid crystals are not dissolved in the hydrophilic solvent at the specific temperature.

At the step S106, a centrifugal process is performed to the mixture of the display medium material and the hydrophilic solvent to separate the micro-encapsulated cholesteric liquid crystals from the dispersant. The centrifugal process has centrifugal speeds of about 500 rpm to about 3000 rpm or about 800 rpm to about 2200 rpm, and the total time for the centrifugal process is between about 3 minutes and about 20 minutes or between about 8 minutes and about 13 minutes. The centrifugal process is performed by increasing the centrifugal speeds in order. In one embodiment, the steps of the centrifugal process are performed by a centrifugal speed of between 900 rpm and 1100 rpm continuously being performed for between 2 minutes and 4 minutes, a centrifugal speed of between 1400 rpm and 1600 rpm continuously being performed for between 2 minutes and 4 minutes and a centrifugal speed of between 1900 rpm and 2100 rpm continuously being performed for between 4 minutes and 6 minutes, in order.

After the centrifugal process, the micro-encapsulated cholesteric liquid crystals are precipitated at a lower layer, such that the dispersant, mold, the surface active agents, dyes and other additives dispersed in the hydrophilic solvent are separated from the micro-encapsulated cholesteric liquid crystals.

At the step S108, the hydrophilic solvent and the dispersant, mold, the surface active agents, dyes and other additives dispersed in the hydrophilic solvent are removed by sucking.

At the step S110, the micro-encapsulated cholesteric liquid crystals precipitated at the lower layer are taken out to obtain the micro-encapsulated cholesteric liquid crystals for reuse.

The shell of the micro-encapsulated cholesteric liquid crystal is not destroyed by the hydrophilic solvent at the temperature of between 40° C. and 60° C. Therefore, the micro-encapsulated cholesteric liquid crystals obtained by the above mentioned reuse method has the same properties as micro-encapsulated cholesteric liquid crystals in a non-deteriorated display medium material. The micro-encapsulated cholesteric liquid crystals obtained by the above mentioned reuse method can be directly mixed with an appropriate dispersant to modulate a photoelectric property of the micro-encapsulated cholesteric liquid crystals in the dispersant. In an embodiment, the reused micro-encapsulated cholesteric liquid crystals are mixed with a dispersant by a mixing ratio to form a new display medium material. The material of the dispersant in the new display medium material is the same as the material of the original dispersant in the original display medium material. The mixing ratio of the reused micro-encapsulated cholesteric liquid crystals to the dispersant in the new display medium material is also the same as the mixing ratio of the original micro-encapsulated cholesteric liquid crystals to the original dispersant in the original display medium material. Thus, the new display medium material has a photoelectric property which is the same as that of the original non-deteriorated display medium material.

In another embodiment, the reused micro-encapsulated cholesteric liquid crystals are mixed with a dispersant by a mixing ratio to form a new display medium material. The material of the dispersant in the new display medium material is different from the material of the original dispersant in the original display medium material. The mixing ratio of the reused micro-encapsulated cholesteric liquid crystals to the dispersant in the new display medium material is also different from the mixing ratio of the original micro-encapsulated cholesteric liquid crystals to the original dispersant in the original display medium material. Thus, a photoelectric property of the new display medium material can be modulated according to photoelectric requirements for the new display medium material. Furthermore, the photoelectric property of the new display medium material can also be modulated by other methods, for example, changing the kinds of the cholesteric liquid crystal monomers or changing the mixing ratios of the cholesteric liquid crystal monomers.

Example

Firstly, 100 ml of water was heated to 50° C. to form hot water and then 60 g of a deteriorated display medium material which was not coated into a flexible display panel was added into the hot water to form a mixture. The deteriorated display medium material included micro-encapsulated cholesteric liquid crystals (the material of a shell of the micro-encapsulated cholesteric liquid crystal was PU, and the composition and the ratio of the cholesteric liquid crystal monomers were as shown in Table 1) and a moldy gelatin. After the mixture was stirred for 30 minutes, the moldy gelatin was dissolved in the hot water to form a turbid solution.

TABLE 1

The composition and the ratio of the cholesteric liquid crystal monomers

| cholesteric liquid crystal monomers | percentage (wt %) |
|---|---|
| 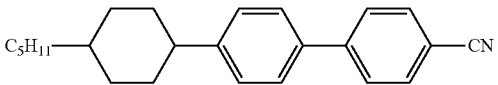 | 10 |
| 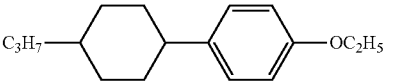 | 5 |
| 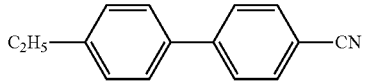 [SMILES: CCc1ccc(-c2ccc(C#N)cc2)cc1] | 15 |
| 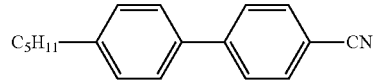 | 30 |
| 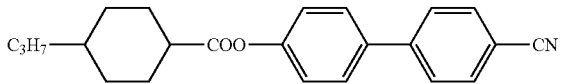 | 10 |

TABLE 1-continued

The composition and the ratio of the cholesteric liquid crystal monomers

| cholesteric liquid crystal monomers | percentage (wt %) |
|---|---|
| $C_7H_{15}$—⟨benzene⟩—⟨benzene⟩—CN | 6 |
| $C_5H_{11}$—⟨benzene⟩—COO—⟨benzene⟩—⟨benzene⟩—CN | 24 |
| Total | 100 |

Then, the turbid solution containing the deteriorated display medium material and water was kept at 50° C. and was put into a centrifugal bottle. A centrifugal process was performed to the turbid solution in the centrifugal bottle by a centrifugal speed of 1000 rpm continuously being performed for 3 minutes, a centrifugal speed of 1500 rpm continuously being performed for 3 minutes and a centrifugal speed of 2000 rpm continuously being performed for 5 minutes, in order. Thus, the micro-encapsulated cholesteric liquid crystals were precipitated at a lower layer of the centrifugal bottle. An upper layer of the centrifugal bottle was a clear water solution with dissolved gelatin. The lower layer of the centrifugal bottle was milky micro-encapsulated cholesteric liquid crystals.

The water solution in the upper layer of the centrifugal bottle was removed from the centrifugal bottle by a pipette. The water solution in the upper layer of the centrifugal bottle contained the moldy gelatin and water.

Then, the micro-encapsulated cholesteric liquid crystals at the lower layer of the centrifugal bottle were taken out for reuse.

In the embodiment, a percentage of the micro-encapsulated cholesteric liquid crystals to be reused was greater than 98 wt %. Through analysis results of new micro-encapsulated cholesteric liquid crystals and reused micro-encapsulated cholesteric liquid crystals by a particle size analyzer, the new micro-encapsulated cholesteric liquid crystals had an average particle size of about 8.501 μm and the reused micro-encapsulated cholesteric liquid crystals had an average particle size of about 8.572 μm. The average particle sizes of the new and the reused micro-encapsulated cholesteric liquid crystals were substantially equal. This showed that the shell of the reused micro-encapsulated cholesteric liquid crystals was not destroyed according to the embodiments.

In addition, a display medium material made from a new micro-encapsulated cholesteric liquid crystal and a display medium material made from a reused micro-encapsulated cholesteric liquid crystal according to the embodiment were coated on plastic plates respectively. For the two display medium materials, except for the new and the reused micro-encapsulated cholesteric liquid crystals, the materials and the composition ratios of other components were the same. Through measuring reflectivities and driving voltages of the two display medium materials, the results showed that the display medium material made from the new micro-encapsulated cholesteric liquid crystals had a reflectivity of 19.8% and a driving voltage of 72 volts; and the display medium material made from the reused micro-encapsulated cholesteric liquid crystals according to the embodiment had a reflectivity of 19.4% and a driving voltage of 71 volts. The measurement results showed that the display medium material made from the reused micro-encapsulated cholesteric liquid crystals according to the embodiment achieved a photoelectric property which was the same as that of the display medium material made from the new micro-encapsulated cholesteric liquid crystal.

Furthermore, a deteriorated display medium material was measured. Except for the deteriorated display medium material being moldy, the materials and the composition ratios of the components of the deteriorated display medium material were the same as that of the display medium material made from the reused micro-encapsulated cholesteric liquid crystals according to the embodiment. The measurement results showed that the deteriorated display medium material had a reflectivity of 17.2% and a driving voltage of 81 volts. Compared with the deteriorated (moldy) display medium material, the photoelectric property of the display medium material made from the reused micro-encapsulated cholesteric liquid crystals according to the embodiment was significantly enhanced.

According to the embodiment, the micro-encapsulated cholesteric liquid crystals in the deteriorated display medium material can be reused and the shell of the micro-encapsulated cholesteric liquid crystals will not be destroyed. Thus, the reused micro-encapsulated cholesteric liquid crystals can be directly mixed with a dispersant to form a new display medium material to be applied in flexible display panels. Therefore, the embodiments can save the material cost of the cholesteric liquid crystal and also satisfy environmental requirements.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method of reusing micro-encapsulated cholesteric liquid crystals, comprising:
   providing a display medium material, containing a micro-encapsulated cholesteric liquid crystal and a dispersant;
   mixing the display medium material with a solvent to form a mixture, wherein the mixture has a temperature of between 40° C. and 60° C.;
   performing a centrifugal process to the mixture for separating the micro-encapsulated cholesteric liquid crystal and the dispersant;
   removing the dispersant and the solvent; and
   obtaining the micro-encapsulated cholesteric liquid crystal.

2. The method of reusing micro-encapsulated cholesteric liquid crystals as claimed in claim 1, wherein the centrifugal process has a centrifugal speed of 500 rpm to 3000 rpm, and the time for the centrifugal process is between 10 minutes and 20 minutes.

3. The method of reusing micro-encapsulated cholesteric liquid crystals as claimed in claim 2, wherein the steps of the centrifugal process comprise a centrifugal speed of between 900 rpm and 1100 rpm continuously being performed for between 2 minutes and 4 minutes, a centrifugal speed of between 1400 rpm and 1600 rpm continuously being performed for between 2 minutes and 4 minutes and a centrifugal speed of between 1900 rpm and 2100 rpm continuously being performed for between 4 minutes and 6 minutes, in order.

4. The method of reusing micro-encapsulated cholesteric liquid crystals as claimed in claim 1, wherein the solvent comprises a hydrophilic solvent.

5. The method of reusing micro-encapsulated cholesteric liquid crystals as claimed in claim 4, wherein the hydrophilic solvent comprises water.

6. The method of reusing micro-encapsulated cholesteric liquid crystals as claimed in claim 1, wherein a weight ratio of the solvent to the display medium material is between 100:1 and 10:9.

7. A method of reprocessing micro-encapsulated cholesteric liquid crystal, comprising:

providing a micro-encapsulated cholesteric liquid crystal obtained from the method of reusing micro-encapsulated cholesteric liquid crystals as claimed in claim 1; and modulating a photoelectric property of the micro-encapsulated cholesteric liquid crystal.

8. The method of reprocessing micro-encapsulated cholesteric liquid crystals as claimed in claim 7, wherein the step of modulating the photoelectric property of the micro-encapsulated cholesteric liquid crystal comprises mixing the micro-encapsulated cholesteric liquid crystal with a dispersant.

* * * * *